(12) United States Patent
Holt et al.

(10) Patent No.: US 7,430,357 B2
(45) Date of Patent: Sep. 30, 2008

(54) HERMETIC SEAL ON METALLIZED FIBER OPTICS

(75) Inventors: Matthew W. Holt, Elon, NC (US);
Frederick Paul Gehrke, Greensboro, NC (US); George W. Walker, III, Kernersville, NC (US)

(73) Assignee: General Dynamics Advanced Information Systems, Inc., Fairfax, VA (US)

( * ) Notice: Subject to any disclaimer, the term of this patent is extended or adjusted under 35 U.S.C. 154(b) by 0 days.

(21) Appl. No.: 10/633,485

(22) Filed: Jul. 31, 2003

(65) Prior Publication Data
US 2004/0264895 A1 Dec. 30, 2004

Related U.S. Application Data

(60) Provisional application No. 60/483,256, filed on Jun. 27, 2003.

(51) Int. Cl.
*G02B 6/00* (2006.01)
*G02B 6/44* (2006.01)

(52) U.S. Cl. ............... 385/138; 385/12; 385/31; 385/100; 385/102; 385/107; 385/134; 385/147

(58) Field of Classification Search ............ 385/12–13, 385/31, 53–94, 100–121, 134–140, 147
See application file for complete search history.

(56) References Cited

U.S. PATENT DOCUMENTS

| | | | | |
|---|---|---|---|---|
| 4,135,587 A * | 1/1979 | Diaz | ............... | 174/92 |
| 4,295,707 A * | 10/1981 | Nakai et al. | ............... | 385/101 |
| 4,345,816 A * | 8/1982 | Nakai et al. | ............... | 385/138 |
| 4,389,086 A * | 6/1983 | Furusawa et al. | ............... | 385/138 |
| 4,547,774 A * | 10/1985 | Gould | ............... | 340/854.7 |
| 4,593,969 A * | 6/1986 | Goodman et al. | ............... | 385/37 |
| 4,599,901 A * | 7/1986 | Hirschfeld | ............... | 73/705 |
| 4,653,846 A * | 3/1987 | Yamazaki et al. | ............... | 385/138 |
| 4,707,065 A * | 11/1987 | Jenkins | ............... | 385/138 |
| 4,708,433 A * | 11/1987 | Kakii et al. | ............... | 385/54 |
| 4,721,586 A * | 1/1988 | Kakii et al. | ............... | 264/1.25 |
| 4,784,811 A * | 11/1988 | Hirschfeld | ............... | 264/1.27 |
| 5,333,227 A * | 7/1994 | Ishiharada et al. | ............... | 385/100 |
| 5,680,495 A * | 10/1997 | Bloom | ............... | 385/94 |
| 5,970,194 A * | 10/1999 | Dunn et al. | ............... | 385/95 |
| 6,088,504 A * | 7/2000 | Filas et al. | ............... | 385/138 |
| 6,744,965 B2 * | 6/2004 | Arab-Sadeghabadi et al. | ............... | 385/147 |
| 2001/0033729 A1 * | 10/2001 | Kuroha | ............... | 385/138 |
| 2002/0064367 A1 * | 5/2002 | Arab-Sadeghabadi et al. | ............... | 385/147 |
| 2004/0146262 A1 * | 7/2004 | Byrd et al. | ............... | 385/128 |
| 2004/0175092 A1 * | 9/2004 | Young et al. | ............... | 385/138 |

* cited by examiner

*Primary Examiner*—Frank G Font
*Assistant Examiner*—Ryan Lepisto
(74) *Attorney, Agent, or Firm*—Steptoe & Johnson LLP

(57) ABSTRACT

A fiber optic cable includes multiple optical fibers extending from a low-pressure environment into a high-pressure environment. At a junction region, the optical fibers are substantially free of any coating, while the fibers include a coating in the low- and high-pressure regions. The fibers are metallized in the junction region, and an epoxy layer is bonded to the metallization. A protective, conductive housing is positioned around the cable. The fibers in the low-pressure region are coupled to communications electronics, and the pattern is repeated as needed to form a needed length of communication cable.

28 Claims, 5 Drawing Sheets

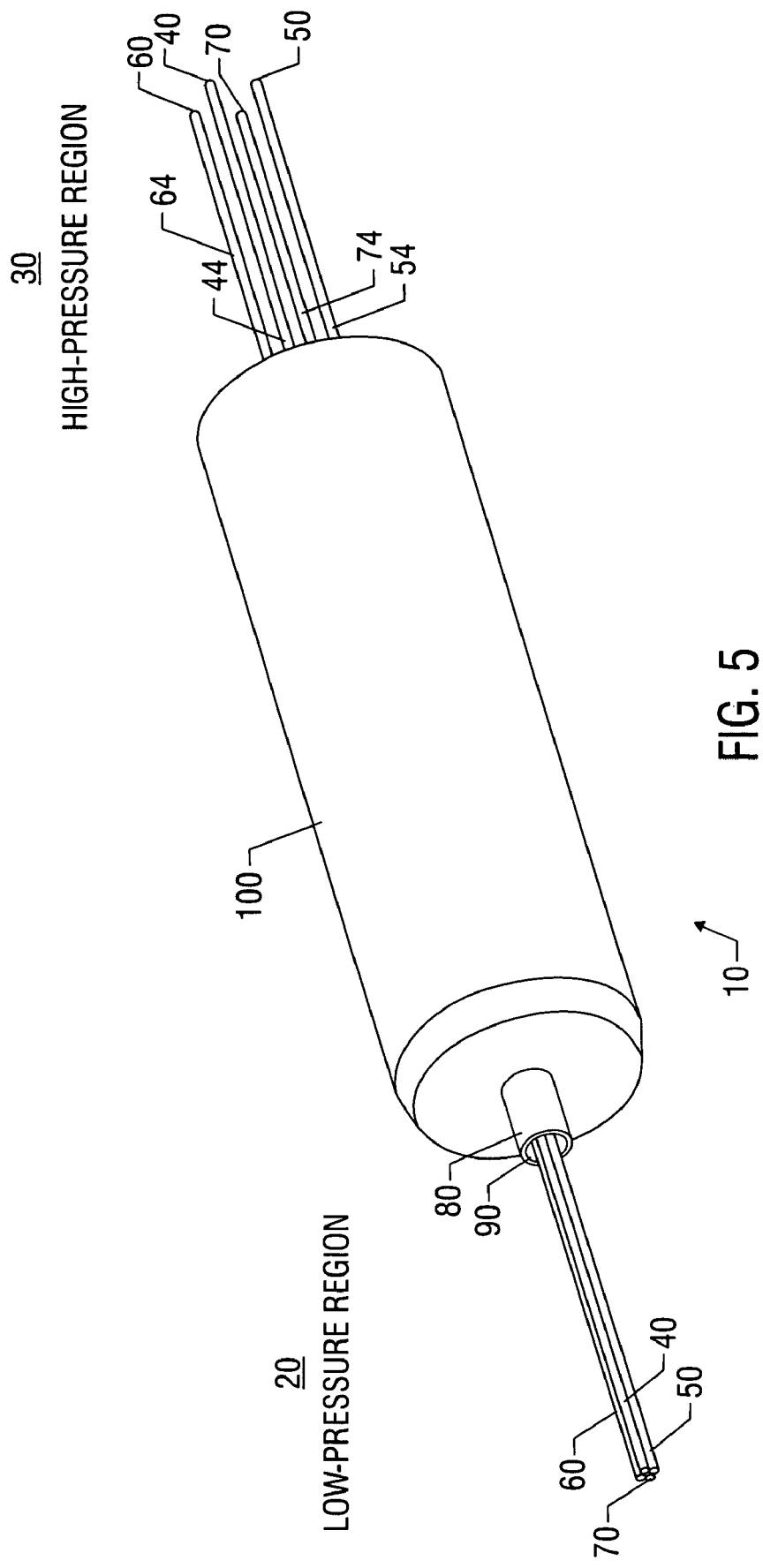

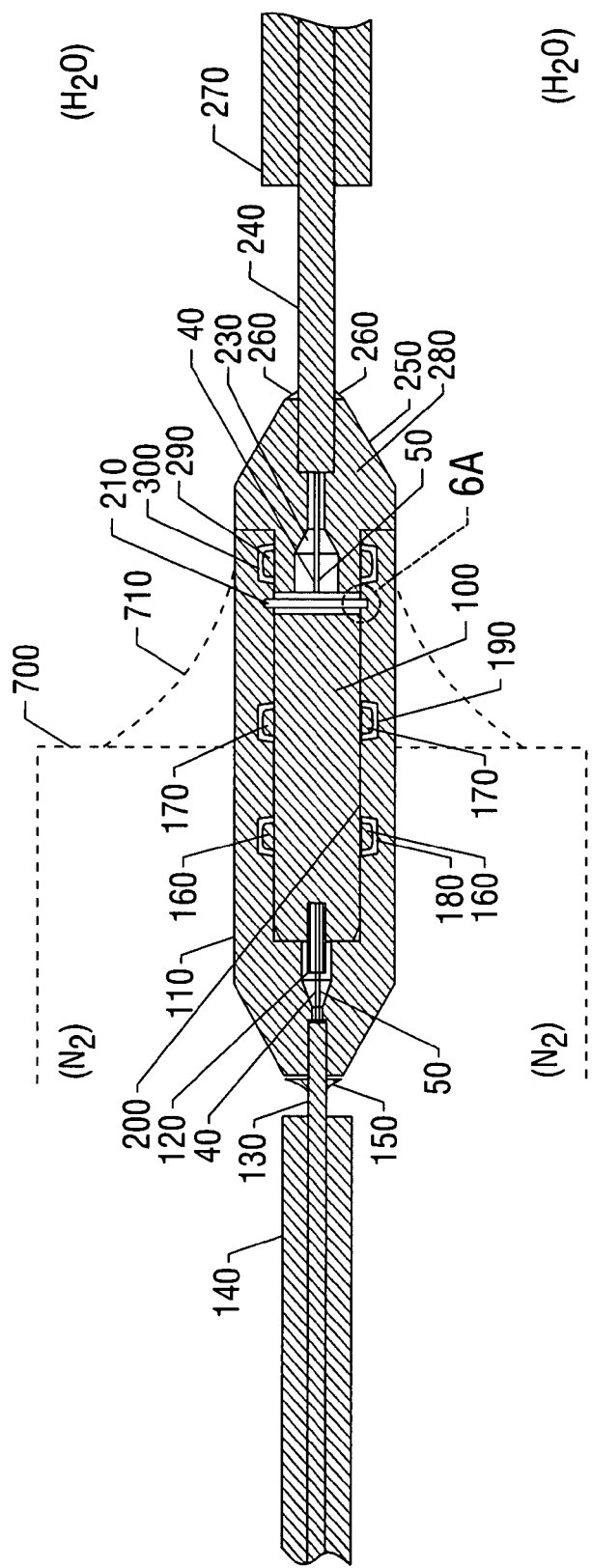
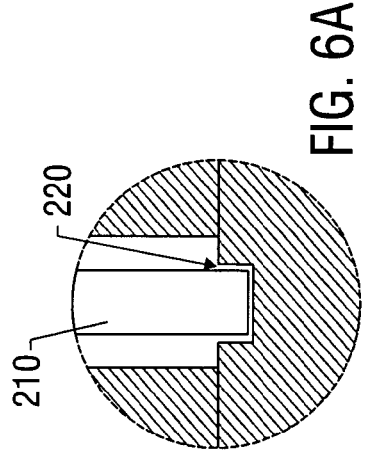
FIG. 6
FIG. 6A

HERMETIC SEAL ON METALLIZED FIBER OPTICS

This application claims priority to provisional patent application Ser. No. 60/483,256, entitled "Epoxy Seal on Metallized Fiber Optics" by Matthew W. Holt, Fred P. Gehrke and George W. Walker, filed on Jun. 27, 2003, which is incorporated herein by reference.

BACKGROUND OF THE INVENTION

As data transmission bandwidth demands increase, fiber optic cables are in increasing use in many applications. One such application of high importance is transmission of data by undersea cables.

In this setting, the pressures on electrical and/or optical connectors and cabling pose a threat to the integrity of the transmission cables. Junction regions are particularly vulnerable, such as where a high-pressure region is coupled to a low-pressure region in an undersea environment.

Some systems currently in use include a "multi-gland" fiber seal to block the passage of gases and fluids. Such seals generally have to be hand crafted and formed in matched groups with tight specifications, and are designed primarily to prevent water ingress in the event of a cable breach. Gland seals are somewhat limited in their ability to tolerate high pressure.

There is a need for a seal for undersea cables, including cable junctions, that does not need to be hand-made and is tolerant of variations in the manufacture process without compromising integrity. In particular, there is a need for such a seal that protects against the passage of both gases and liquids, and that survives high-pressure environments intact.

An advantage of the epoxy seal vis-à-vis prior sealing arrangements, such as multi-gland seals, is the ability of the seal to operate while at pressure with an optical loss of less than approximately 0.05 db. This can be achieved by the bonding of the optical fibers plating to the epoxy material, minimizing or preventing possible extrusions at high pressure, which could cause damage to the optical path.

SUMMARY OF THE INVENTION

The present invention uses optical fibers with metallization applied directly to the optical fiber (i.e. with no intervening cladding or coating). The metallized optical fiber is cast in high-strength epoxy to create a multiple-fiber seal capable of surviving extremely high pressures (more than 10,000 psi) and long-term exposure to hydrostatic loads with minimal diminishment in performance of the optical fiber. The invention is applicable to other types of cables, such as metal conductive cables or multiconductor cables.

Conductive tubes are positioned surrounding the sealed fiber optic cable, both providing pressure protection and forming a continuous conductive path through which power may be supplied to electronics served by the cable. An insulating polyethylene outer sleeve may be positioned around the conductive tubes.

The invention also includes a method of sealing fiber optic cables, including removing, as necessary, any cladding or coating on the optical fibers, metallizing at least a portion of the area where the coating was removed, and applying a high-strength sealing or bonding agent such as epoxy to that area.

The invention also includes a data transmission system utilizing a sealed fiber optic cable as described, with at least one electronic module including communications equipment in a relatively low-pressure environment coupled to the fiber optic cable which is positioned in a relatively high-pressure environment.

BRIEF DESCRIPTION OF THE DRAWINGS

FIG. 5 is a perspective of the junction region shown in FIG. 1.

FIG. 6 is a sectional view of a junction region for fiber optic cables including a pressure housing.

FIG. 6A is an expanded view of a portion of FIG. 6.

DETAILED DESCRIPTION

Figure 1:
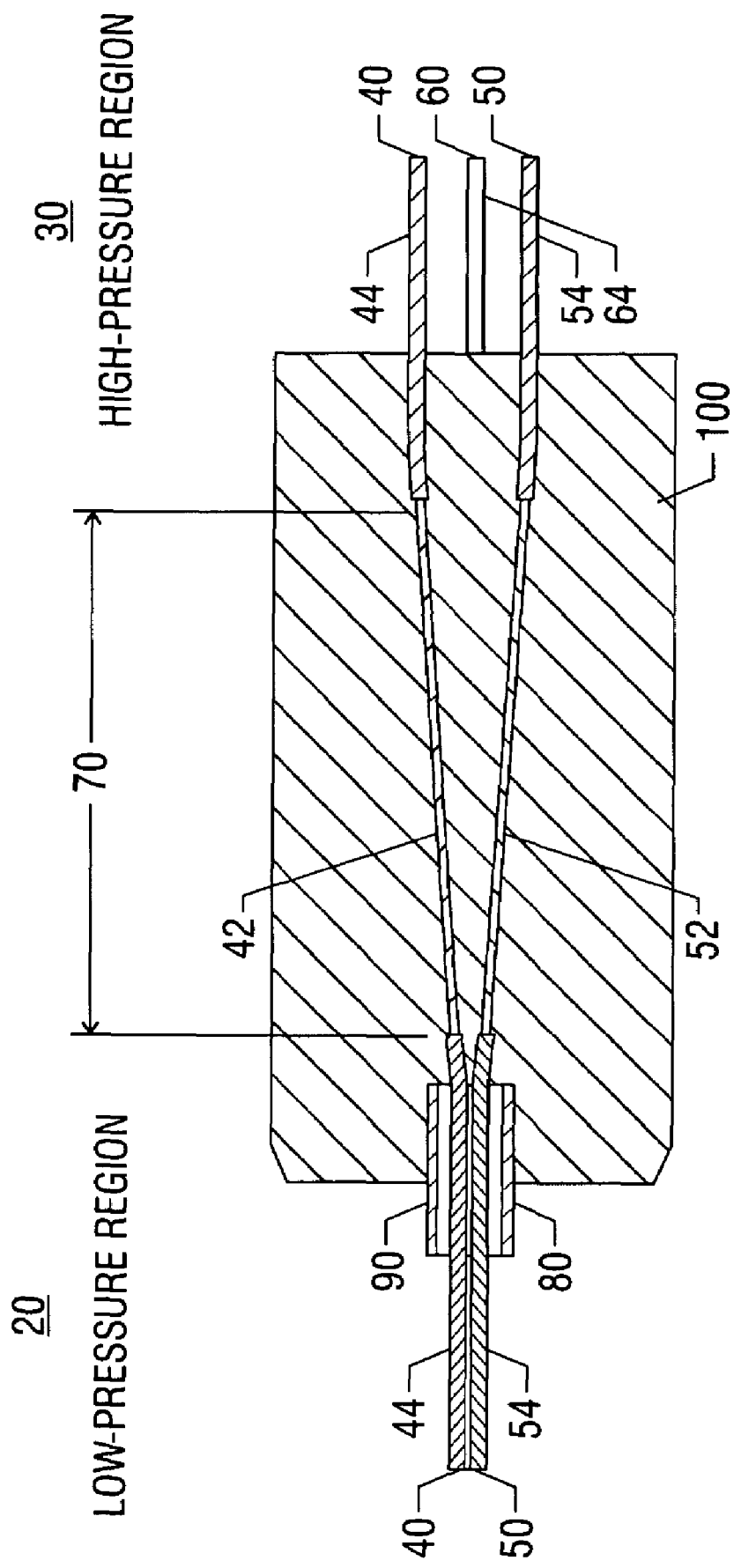
FIG. 1 is a sectional view of a junction region for fiber optic cables including a seal according to the invention.
Figure 4:
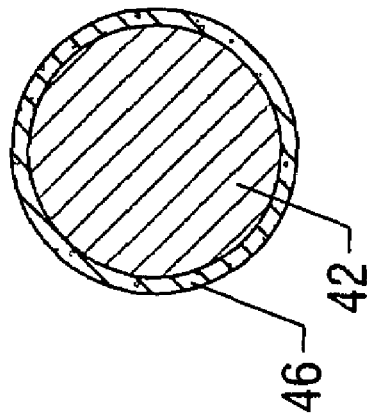
FIGS. 2-4 illustrate stages in a process of stripping and metallizing a portion of fiber optic cable.
Figure 3:
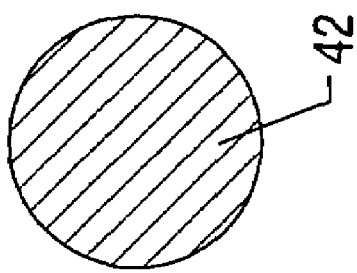
Figure 2:
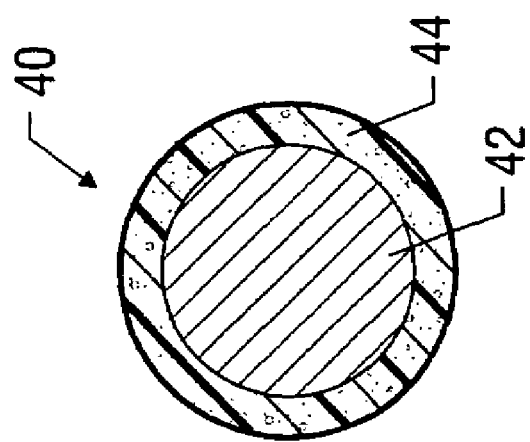

In FIG. 1, a junction region 10 is shown, wherein one or multiple fiber optic cables, or other types of cables, wires, lines, etc., pass from a region 20 to a region 30. In the embodiment shown in FIG. 1, region 20 is a relatively low-pressure region, and region 30 is a relatively high-pressure region. For example, region 30 may be a region on an ocean floor, subject to the high pressures of that environment, while region 20 may be part of an undersea electronics module or station, which is filled with nitrogen gas and protected from the high water pressure outside the module.

As used herein, the term "cable" may refer to a single optical fiber, multiple optical fibers, one or more wires, conductors, communications cables, or other similar structures to which a seal may need to be applied.

The "low" and "high" pressures are relative, and either may be less or greater than, e.g., standard atmospheric pressure. There need not even be a pressure differential between regions 20 and 30, but rather this may be a transition from one environment to another where it is desired that fluids (e.g. liquids or gases) or other materials should not pass between the environments.

In the embodiment of FIG. 1 and (FIG. 5), four cables 40, 50, 60 and 70 pass between regions 20 and 30. Other numbers of cables will be suitable for use in the invention. In this example, the cables 40-70 are optical fibers, each with a silica or other suitable core 42, 52, etc. (see FIGS. 1 and 2-4), and each with a conventional cladding layer, coating or buffer material 44, 54, 64 and 74, respectively. This coating may be acrylate or another suitable coating.

Region 70 in FIG. 1 (and see FIG. 3) depicts a length of the fibers 40-70 where the coating 44-74 has been removed to expose the silica core 42-72. This may be done by laser ablation, mechanical removal, chemical removal or other suitable processes that will strip off the coating. A laser process is less likely to result in damage to the fiber optic core than a mechanical process. Thus, an initial step of removing, as necessary, at least some of a layer over the cable core may be regarded as removing nothing (if a suitable material is already presented to which a bonding layer such as epoxy is exposed) or removing a sufficient amount (either none or a positive amount) of the overlayer such that a surface is exposed to which a bonding layer (e.g. metallization) may be applied.

The coating is substantially entirely removed from the silica core. A suitable process for stripping the coating can be carried out by, for example, using the laser stripping process of Resonetics, Inc. of Nashua, N.H., which is capable of mid-span optical fiber coating removal with minimal degradation of the silica core.

The region 70 where the core is exposed is directly metallized using, for example, a chemical vapor deposition of chromium (or chrome), nickel and gold (or some combination of one or more of these), forming a metallic bonding layer (e.g. layer 46 in FIG. 4) around the core. Other metals may be appropriate for the bonding layer, as long as epoxy bonds to the metal(s) sufficiently to form a seal with a desired level of pressure resistance. Other (nonmetallic or metallic) materials may be suitable for forming the bonding layer.

The metallization (or plating) is "directly" on the fiber core in the sense that there is substantially no intervening acrylate or other coating for at least a portion of the metallized region, though other materials to which the epoxy or other sealant may bond could be present.

The plating creates a substrate to which the epoxy can bond, thereby eliminating or minimizing a path along the outside of the fiber where fluid would otherwise be able to travel through the overmolded volume of fiber. Removal of the acrylate coating also eliminates a fluid path, either permeating the acrylate or through flaws or cracks therein.

Region 70 may be about a half an inch (or 1-2 centimeters) long, and in general may be made sufficiently long for a given environment such that the sealing effect along the length of the completed seal meets some predetermined criterion, such as a maximum leak rate.

Figure 7:
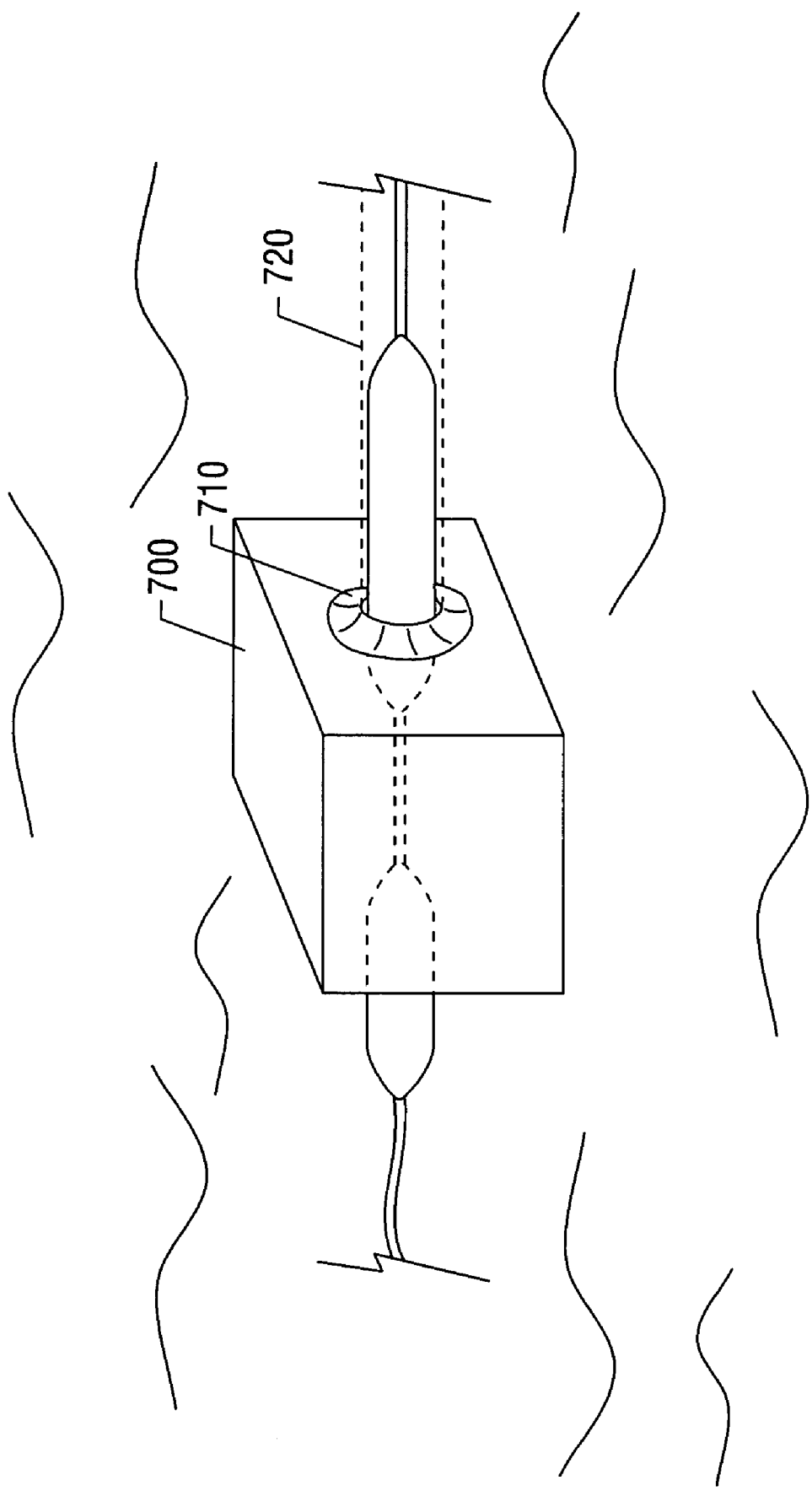
FIG. 7 is a view of an undersea environment in which embodiments of the invention may be used.

The optical fibers 40-70 may be bundled together (see FIGS. 1 and 5) to pass into region 20. As shown in FIG. 7, this region may include an electronics module or box 700, or may be some other region different from region 30, as discussed above. The module 700 may include one or more repeaters, multiplexers, and/or other appropriate equipment, such as communications or data transmission equipment.

During assembly of the junction region 10 shown in FIG. 1, a fiber guide/strain relief 80 may be positioned over a portion of the cables 40-70 near where they are bundled more closely together. The strain relief 80 may be a flexible Teflon® or other tube, and may be filled with an epoxy 90 (e.g. an ultraviolet-curable epoxy) or other bonding agent that assists in holding the tube 80 in position over the area where they come together, to help prevent undue bending or breakage in that area.

The fiber region 70, and optionally also the regions of the fibers extending somewhat beyond (to the left and right from the point of view of FIG. 1), are then placed into a mold, and cast with an epoxy for an amount of time sufficient that it will adhere or bond to at least a portion of the metallized area of the fiber, creating a seal around each individual fiber and eliminating the diffusion/leak path for helium and sea water. The epoxy (which may also be UV-curable) or other pressure-resistant bonding agent 100 is thus applied to a length of the fibers 40-70 between the strain relief (if present) or the region 20 (if no strain relief is used) and the region 30, as illustrated in FIG. 1.

Epoxy bonds well to the metallization in the region 70, and when hardened forms a durable coupling between the regions 20 and 30, thereby providing a seal around the fibers against the passage of fluids even at very high pressure differentials. This structure avoids the cracking in the coatings and resulting formation of fluid passageways that can occur if the coatings are not removed before application of the epoxy. The metallization forms a good bond or adhesion to the silica core, and the epoxy bonds well with the metallization, thus substantially eliminating weak spots in the pressure protection.

FIG. 5 is an exterior perspective view of a structure as described with respect to FIG. 1.

FIG. 6 is a sectional view of the structure shown in FIGS. 1 and 5, illustrating an embodiment where the epoxy-sealed structure is used in a position marking the transition between a very high-pressure setting and a lower-pressure setting, such as the transition between an undersea environment and an electronics module 700 (see FIG. 7). The optical fibers 40-70 are inserted through a conductive or voltage-carrying pressure housing 110, which may be a substantially rigid metal tube, such as made out of beryllium-copper, and thus pass through passageway 120 and into a tube 130 made of copper (or another suitable material such as a conductive material that resists pressure and corrosion). The tube 130 may itself be at least partially enclosed by a sleeve of an insulating material, such as polyethylene tube 140.

To affix the tube 130 to the housing 110, a brazed alloy fillet 150 is applied circumferentially around the tube 130.

O-ring seals 160 and 170 may be positioned within circumferential grooves 180 and 190 formed on an inner surface 200 of the housing 110, to prevent passage of fluids through the interior cylindrical cavity defined by surface 200. Thus, in this embodiment, the epoxy seal 100 has an outer surface that closely matches the shape of inner surface 200, e.g. a cylindrical shape (whose cross-section may be circular or some other shape), so that the O-rings can provide a good seal against fluid passage.

A retainer ring 210 is positioned within a groove 220 in the housing 110 (see expanded view of FIG. 6A) to retain the assembly including the epoxy seal 100 within the housing 110 interior cavity. The fibers 40-70 pass through an opening (not separately shown) in the retainer ring 210 and through a passageway 230, and thence into a substantially rigid fiber housing or tube 240. A housing 250 (which may be of beryllium-copper or some other conductor) surrounds the optical fibers and is tack-welded to the housing 110 at points of contact between the two, in effect forming a single housing including housings 110 and 250 that encloses the epoxy seal junction region.

The tube 240 is affixed to the housing 250 by brazed alloy fillet 260, which extends circumferentially around the tube 240. An insulating polyethylene sleeve or tube 270 may be provided around the tube 240 in the undersea (or other aqueous or fluid) environment. Thus, the entire assembly shown in FIG. 6 (except for the module 700) may in this embodiment be substantially circular in cross-section, or at least include no sharp angles that would make sealing difficult or less effective.

The housing 110, in cooperation with the tubes 140 and 260, in some embodiments forms a continuous conductive path that may be used to carry a current to devices along the fiber optic cable, for instance to power electronics within the housing 700.

The combined housing 110-250 includes a portion 280 that extends into the generally cylindrical cavity formed by the inner surface 200, and abuts a sealing O-ring 290 positioned within a circumferential groove 300, similar to the position of with O-rings 160-170 within grooves 180-190, thus preventing or minimizing fluid passage within the cavity past portion 280.

A suitable seal 710, such as a Bridgeman seal, may be provided where the tubes 130 and 140 pass into the module 700 (see FIGS. 6 and 7), and an overall protective sleeve tube 720 may be provided over the junction structure as illustrated, and may be formed of an insulating material such as polyethylene. Thus, the sleeves 140, 270 and 720 may be regarded as three separate sleeves (and may be applied at different times), but when complete may function as a single insulating sleeve.

As shown in FIG. 7, an additional such sealed junction region may be coupled to the electronics modulus 700 to continue passage of the cable beyond the module. This will be a common configuration in a situation where the module 700 is not a terminal module or station, e.g., wherein it is a repeater in a communication system. Thus, tubes and seals corresponding to tubes 270, 720, 140 and seal 710, respectively can include a structure similar to that shown in FIG. 6, to form a junction region extending from module 700 back into the undersea environment, in which the cable extends to the next repeater station or other electronic equipment.

A structure with features of the above exemplary implementations of the invention have been subjected to a helium leak test (at around 10,000 psi), which resulted in a leak rate of less than $1 \times 10^{-9}$ std cc/sec Helium, and long-term exposure to hydrostatic loads to 12,000 psi with an optical loss less than 0.05 db during operation.

An epoxy seal according to the above description thus creates a hermetic seal around the voltage and optical path. This allows undersea systems pressure vessels to be high-pressure helium leak-tested after welding to verify the welds' integrity as well as preventing water or other fluid ingress into the vessel while deployed. The seal also helps maintain the nitrogen pressure in the vessel (module) during the system's storage and in use conditions.

In an optical seal (i.e. sealing of an optical fiber or cable), this sealing method can eliminate or substantially reduce the cost and process times that would otherwise be involved using a multi-gland fiber seal mentioned above. The present invention provides sealing at higher pressures than gland seals, at least in part by minimizing or eliminating the fluid path available along the acrylate coating on the optical fiber, which forms a path for fluid ingress into the pressure vessel. Removal of the acrylate coating and metallizing the optical fiber directly, and then applying an epoxy seal, leads to much better sealing properties.

What is claimed is:

1. A method for forming a seal on a cable having a core material, including the steps of:
   removing an amount of an overlayer on the core material sufficient to expose a surface to which a bonding layer may be applied;
   creating a bonding layer by plating the exposed surface with a metal to form a metal-plated surface;
   applying a bonding agent to at least a portion of the metal after the metal has been plated on to the exposed surface, the bonding agent being applied by:
   placing a region of the cable into a mold; and
   applying epoxy to a region of the optical fiber disposed in a mold for a sufficient time to bond the epoxy to at least a portion of the metal-plated surface.

2. The method of claim 1, wherein the step of plating the exposed surface includes applying a layer including at least one of chromium, nickel and gold.

3. The method of claim 1, wherein the step of applying a bonding agent includes the step of applying epoxy to the metal-plated surface.

4. The method of claim 1, wherein:
   the cable includes a plurality of optical fibers, each having a silica core; and
   the step of plating the exposed surface includes the step of applying at least one of chromium, nickel and gold to each silica core in the cable.

5. The method of claim 1, wherein the step of plating the exposed surface with a metal to form a metal-plated surface includes plating the exposed surface using a chemical vapor deposition process.

6. An optical fiber cable, including:
   a plurality of optical fibers each having a silica core, the cable having a first region wherein at least some of the optical fibers have a first coating, a second region wherein at least some of the optical fibers have substantially no coating, and having a third region wherein at least some of the optical fibers have a second coating;
   a metal-plating applied to at least a portion of a second region;
   an epoxy seal bonded to the metal plating of at least some of the optical fibers in the second region and extending partly into the first region and partly into the third region;
   a first conductive tube surrounding at least a portion of the first region; a second conductive tube surrounding at least a portion of the third region; and
   a conductive housing surrounding at least a portion of the second region, including the epoxy seal;
   wherein the first conductive tube, second conductive tube and conductive housing form a continuous conductive path.

7. The optical fiber cable of claim 6, further including an insulating sleeve over each of the first conductive tune, second conductive tube and conductive housing.

8. The optical fiber cable of claim 7, wherein the insulating sleeve includes polyethylene.

9. The cable of claim 6, wherein the first region is exposed to a first environment, and the third region is exposed to a second environment different from the first environment.

10. The cable of claim 9, wherein the first environment has a different atmospheric pressure then said second environment.

11. The cable of claim 9, wherein atmospheric pressures of said first and second environments differ by at least 10,000 psi.

12. A system for transmission of data between a first environment having a low relative pressure and a second environment having a high relative pressure, including:
   a communications cable including a plurality of optical fibers each having a silica core, the cable having a first region wherein at least some of the optical fibers have a first coating, having a second region wherein at least some of the optical fibers have substantially no coating, and having a third region wherein at least some of the optical fibers have a second coating;
   a metal plating in contact with at least some exposed optical fibers of the second region;
   an epoxy seal being molded about the metal plating, enclosing all of the second region and extending at least partially into the first region and partly into the third region; and
   at least one electronics module positioned within the first environment and coupled to a portion of the optical fibers in the first region.

13. The transmission system of claim 12, further including:
   a first conductive tube surrounding at least a portion of the first region;
   a second conductive tube surrounding at least a portion of the third region; and
   a conductive housing surrounding at least a portion of the second region, including the epoxy seal;
   wherein the first conductive tube, second conductive tube and conductive housing form a continuous conductive path.

14. The transmission system of claim 13, further including a sleeve over each of the first conductive tube, second conductive tube and conductive housing.

15. The transmission system of claim 14, wherein the sleeve includes polyethylene.

16. The system of claim 12, wherein said metal plating is applied directly to said at least a portion of the second region.

17. The system of claim 12, wherein said epoxy is applied directly to an outer surface of said metal plating.

18. The cable of claim 12, wherein the first region is exposed to a first environment, and the third region is exposed to a second environment different from the first environment.

19. The cable of claim 18, wherein the first environment has a different atmospheric pressure then said second environment.

20. The cable of claim 19, wherein atmospheric pressures of said first and second environments differ by at least 10,000 psi.

21. A system for transmission of data between a first environment having a low relative pressure and a second environment having a high relative pressure, including:
    a communications cable including a plurality of optical fibers each having a silica core, the cable having a first region wherein at least some of the optical fibers have a first coating, having a second region wherein at least some of the optical fibers have substantially no coating, and having a third region wherein at least some of the optical fibers have a second coating;
    a metal plating in contact with at least some exposed optical fibers of the second region;
    an epoxy seal being molded about the metal plating enclosing all of the second region and extending at least partially into the first region and extending partly into the third region; and
    at least one electronics module positioned within the first environment and coupled to a portion of the optical fibers in the first region.

22. The transmission system of claim 21, further including:
    a first conductive tube surrounding at least a portion of the first region;
    a second conductive tube surrounding at least a portion of the third region; and
    a conductive housing surrounding at least a portion of the second region, including the epoxy seal;
    wherein the first conductive tube, second conductive tube and conductive housing form a continuous conductive path.

23. The transmission system of claim 22, further including a sleeve over each of the first conductive tube, second conductive tube and conductive housing.

24. The transmission system of claim 23, wherein the sleeve includes polyethylene.

25. The cable of claim 21, wherein the first region is exposed to a first environment, and the third region is exposed to a second environment different from the first environment.

26. The cable of claim 25, wherein the first environment has a different atmospheric pressure then said second environment.

27. The cable of claim 26, wherein atmospheric pressures of said first and second environments differ by at least 10,000 psi.

28. A method for forming a seal on a cable having a core material, including the steps of:
    providing a cable having a portion of an overlayer removed and a metal plated bonding layer covering the exposed core material in the portion;
    applying a bonding agent to at least a portion of the metal plated bonding layer, the bonding agent being applied by:
        placing a region of the cable into a mold; and
        applying epoxy to a region of the optical fiber disposed in a mold for a sufficient time to bond the epoxy to at least a portion of the metal-plated surface.

* * * * *